US008777232B2

(12) United States Patent
Yaksich

(10) Patent No.: US 8,777,232 B2
(45) Date of Patent: Jul. 15, 2014

(54) SELF-TIGHTENING CHUCK WITH A RADIAL LOCK

(75) Inventor: Theodore G. Yaksich, Seneca, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 667 days.

(21) Appl. No.: 12/843,991

(22) Filed: Jul. 27, 2010

(65) Prior Publication Data

US 2011/0024997 A1  Feb. 3, 2011

Related U.S. Application Data

(60) Provisional application No. 61/229,669, filed on Jul. 29, 2009.

(51) Int. Cl.
*B23B 31/16* (2006.01)
*B23B 31/12* (2006.01)

(52) U.S. Cl.
CPC ....... *B23B 31/1253* (2013.01); *B23B 2260/008* (2013.01); *B23B 31/123* (2013.01)
USPC ................ 279/64; 276/60; 276/140; 276/902

(58) Field of Classification Search
CPC ..................... B23B 31/1253; B23B 2260/008; Y10S 279/902
USPC ...................... 279/60–65, 140, 902
IPC ........................................................ B23B 31/16
See application file for complete search history.

(56) References Cited

U.S. PATENT DOCUMENTS 573,189 A    12/1896  Vogel
1,119,330 A   12/1914  Wakfer
(Continued)

FOREIGN PATENT DOCUMENTS

DE    4207087 A1 *  9/1993  ............. B23B 31/02
EP    0468128        6/1994
(Continued)

OTHER PUBLICATIONS

US 6,406,035, 06/2002, Grogan et al. (withdrawn)

*Primary Examiner* — Eric A Gates
(74) *Attorney, Agent, or Firm* — Nelson Mullins Riley & Scarborough, LLP

(57) ABSTRACT

A drill chuck including a spindle portion with a pusher bore, a spindle bore, an annular array of teeth, and an annular groove defined by the outer surface of the first end. A body is rotatably disposed about the spindle portion and includes a central bore, an annular groove defined by the central bore, and a pawl pivotably mounted to the body for selectively engaging the annular array of teeth. A jaw pusher includes a threaded post and a head, the threaded post being disposed in the pusher bore and configured for axial motion. A jaw guide is disposed on the first end of the body and includes a plurality of jaw slots. A plurality of jaws is slidably received in the corresponding jaw slots and slidably received by the head of the jaw pusher. A plurality of bearing balls is received between the annular groove of the spindle portion and the annular groove of the body. The annular groove of the spindle portion and the annular groove of the body form a continuous pair of bearing races for the plurality of bearing balls.

16 Claims, 11 Drawing Sheets

(56) References Cited

U.S. PATENT DOCUMENTS

| | | | |
|---|---|---|---|
| 1,410,080 | A | 3/1922 | Schwahlen |
| 1,748,511 | A | 2/1930 | Johnson |
| 2,108,032 | A | 2/1938 | Allen |
| 2,458,824 | A | 1/1949 | Axelsson |
| 2,684,856 | A | 7/1954 | Stoner |
| 2,784,976 | A | 3/1957 | Ondeck |
| 3,244,428 | A | 4/1966 | Rohm |
| 3,506,277 | A | 4/1970 | Harms |
| 3,545,776 | A | 12/1970 | Haviland |
| 3,712,633 | A | 1/1973 | Schadlich |
| 3,807,745 | A | 4/1974 | Bent |
| 3,970,323 | A | 7/1976 | Schnizler, Jr. |
| 4,060,251 | A | 11/1977 | Amyot |
| 4,213,622 | A | 7/1980 | Rohm |
| 4,213,623 | A | 7/1980 | Rohm |
| 4,214,765 | A | 7/1980 | Rohm |
| 4,230,327 | A | 10/1980 | Rohm |
| 4,272,087 | A | 6/1981 | Rohm |
| 4,274,642 | A | 6/1981 | Wunsch |
| 4,277,074 | A | 7/1981 | Kilberis |
| 4,284,285 | A | 8/1981 | Futter |
| 4,302,021 | A | 11/1981 | Rohm |
| 4,395,170 | A | 7/1983 | Clarey |
| 4,418,926 | A | 12/1983 | Rohm |
| 4,418,927 | A | 12/1983 | Rohm |
| 4,456,271 | A | 6/1984 | Kern et al. |
| 4,463,960 | A | 8/1984 | Walton |
| 4,491,445 | A | 1/1985 | Hunger et al. |
| 4,498,682 | A | 2/1985 | Glore |
| 4,526,497 | A | 7/1985 | Hatfield |
| 4,536,113 | A | 8/1985 | Hatfield |
| 4,583,751 | A | 4/1986 | Rohm |
| 4,602,799 | A | 7/1986 | Rohm |
| 4,607,855 | A | 8/1986 | Rohm |
| 4,619,461 | A | 10/1986 | Rohm |
| 4,621,818 | A | 11/1986 | Rohm |
| 4,621,819 | A | 11/1986 | Rohm |
| 4,621,820 | A | 11/1986 | Rohm |
| 4,627,626 | A | 12/1986 | Rohm |
| 4,627,627 | A | 12/1986 | Rohm |
| 4,627,628 | A | 12/1986 | Rohm |
| 4,660,841 | A | 4/1987 | Chouinard |
| 4,669,932 | A | 6/1987 | Hartley |
| 4,682,918 | A | 7/1987 | Palm |
| 4,695,065 | A | 9/1987 | Komatsu et al. |
| 4,695,066 | A | 9/1987 | Rohm |
| 4,700,956 | A | 10/1987 | Rohm |
| 4,702,485 | A | 10/1987 | Rohm |
| 4,703,941 | A | 11/1987 | Rohm |
| 4,703,942 | A | 11/1987 | Rohm |
| 4,711,457 | A | 12/1987 | Wezel |
| 4,773,657 | A | 9/1988 | Rohm |
| 4,836,563 | A | 6/1989 | Rohm |
| 4,840,387 | A | 6/1989 | McCarthy |
| 4,844,482 | A | 7/1989 | Rohm |
| 4,848,779 | A * | 7/1989 | Wheeler et al. ............ 279/60 |
| 4,902,025 | A | 2/1990 | Zimdars |
| 4,913,449 | A | 4/1990 | Rohm |
| 4,930,793 | A | 6/1990 | Ando |
| 4,951,955 | A | 8/1990 | Sakamaki |
| 4,955,623 | A | 9/1990 | Rohm |
| 4,958,840 | A | 9/1990 | Palm |
| 4,968,191 | A | 11/1990 | Palm |
| 5,009,439 | A | 4/1991 | Sakamaki |
| 5,031,925 | A | 7/1991 | Tatsu et al. |
| 5,044,643 | A | 9/1991 | Nakamura |
| 5,054,796 | A | 10/1991 | Rohm |
| 5,125,673 | A | 6/1992 | Huff et al. |
| 5,145,192 | A | 9/1992 | Rohm |
| 5,145,193 | A | 9/1992 | Rohm |
| 5,145,194 | A | 9/1992 | Huff et al. |
| 5,158,306 | A | 10/1992 | Rohm |
| 5,171,030 | A | 12/1992 | Rohm |
| 5,172,923 | A | 12/1992 | Nakamura |
| 5,174,588 | A | 12/1992 | Reibetanz et al. |
| 5,183,274 | A | 2/1993 | Sakamaki |
| 5,195,760 | A | 3/1993 | Wheeler et al. |
| 5,215,317 | A | 6/1993 | Jordan et al. |
| 5,232,230 | A | 8/1993 | Lin |
| 5,234,223 | A | 8/1993 | Sakamaki |
| 5,236,206 | A | 8/1993 | Rohm |
| 5,261,679 | A | 11/1993 | Nakamura |
| 5,267,741 | A | 12/1993 | Leitner |
| 5,286,041 | A | 2/1994 | Rohm |
| 5,322,303 | A | 6/1994 | Nakamura |
| 5,375,857 | A | 12/1994 | Rohm |
| 5,375,858 | A | 12/1994 | Rohm |
| 5,378,002 | A | 1/1995 | Rohm |
| 5,407,215 | A | 4/1995 | Yang |
| 5,411,275 | A | 5/1995 | Huff et al. |
| 5,431,419 | A | 7/1995 | Mack |
| 5,435,578 | A * | 7/1995 | Rohm ............................ 279/62 |
| 5,458,345 | A | 10/1995 | Amyot |
| 5,464,230 | A | 11/1995 | Rohm |
| 5,470,084 | A | 11/1995 | Reibetanz et al. |
| 5,499,829 | A | 3/1996 | Rohm |
| 5,499,830 | A | 3/1996 | Schnizler |
| 5,503,409 | A | 4/1996 | Rohm |
| 5,531,461 | A | 7/1996 | Huff et al. |
| 5,531,549 | A | 7/1996 | Fossella |
| 5,573,254 | A | 11/1996 | Huff et al. |
| 5,580,197 | A | 12/1996 | Rohm |
| 5,590,985 | A | 1/1997 | Mack |
| 5,615,899 | A | 4/1997 | Sakamaki |
| 5,624,125 | A | 4/1997 | Rohm |
| 5,741,016 | A | 4/1998 | Barton et al. |
| 5,765,839 | A | 6/1998 | Rohm |
| 5,788,248 | A | 8/1998 | Gibson |
| 5,816,582 | A | 10/1998 | Steadings et al. |
| 5,820,134 | A | 10/1998 | Subils Valls |
| 5,826,888 | A | 10/1998 | Weaver et al. |
| 5,829,761 | A | 11/1998 | Rohm |
| 5,829,762 | A | 11/1998 | Claramunt et al. |
| 5,833,247 | A | 11/1998 | Deuschle et al. |
| 5,882,153 | A | 3/1999 | Mack et al. |
| 5,927,914 | A | 7/1999 | Mack et al. |
| 5,957,469 | A | 9/1999 | Miles et al. |
| 5,984,320 | A | 11/1999 | Nakamura |
| 5,988,653 | A | 11/1999 | Kuo |
| 5,988,958 | A | 11/1999 | Mack |
| 5,992,859 | A | 11/1999 | Lin |
| 6,070,884 | A | 6/2000 | Mack |
| 6,073,939 | A | 6/2000 | Steadings et al. |
| 6,095,530 | A | 8/2000 | Rohm |
| 6,129,363 | A | 10/2000 | Mack |
| 6,179,301 | B1 | 1/2001 | Steadings et al. |
| 6,179,512 | B1 | 1/2001 | Gibson et al. |
| 6,217,033 | B1 | 4/2001 | Sakamaki et al. |
| 6,247,706 | B1 | 6/2001 | Kuo |
| 6,257,596 | B1 | 7/2001 | Yang |
| 6,260,856 | B1 | 7/2001 | Temple-Wilson |
| 6,260,857 | B1 | 7/2001 | Wienhold et al. |
| 6,302,407 | B1 | 10/2001 | Hsueh |
| 6,341,783 | B1 | 1/2002 | Rohm |
| 6,354,605 | B1 | 3/2002 | Aultman |
| 6,390,481 | B1 | 5/2002 | Nakamuro |
| 6,398,226 | B1 | 6/2002 | Huggins et al. |
| 6,402,160 | B1 | 6/2002 | Grogan et al. |
| 6,409,181 | B1 | 6/2002 | Hsueh |
| 6,517,088 | B1 | 2/2003 | Rohm |
| 6,536,782 | B2 | 3/2003 | Rohm |
| 6,550,785 | B2 | 4/2003 | Rohm |
| 6,554,292 | B1 | 4/2003 | Rohm |
| 6,575,478 | B2 | 6/2003 | Rohm et al. |
| 6,581,942 | B2 | 6/2003 | Rohm |
| 6,860,488 | B2 | 3/2005 | Mack |
| 6,889,986 | B2 | 5/2005 | Rohm |
| 7,044,480 | B2 | 5/2006 | Huff et al. |
| 7,156,402 | B2 * | 1/2007 | Mack ............................ 279/60 |
| 7,503,565 | B2 * | 3/2009 | Rohm ............................ 279/60 |
| 7,726,663 | B2 * | 6/2010 | Mack et al. ............... 279/60 |
| 7,726,917 | B2 * | 6/2010 | Mack ............................ 408/124 |
| 7,841,601 | B2 * | 11/2010 | Mack ............................ 279/60 |
| 8,056,906 | B2 * | 11/2011 | Mack ............................ 279/64 |

(56) References Cited

U.S. PATENT DOCUMENTS

| | | | |
|---|---|---|---|
| 8,070,168 B2 * | 12/2011 | Mack | 279/60 |
| 8,262,096 B2 * | 9/2012 | Mack | 279/60 |
| 2007/0235951 A1 * | 10/2007 | Mack | 279/60 |
| 2009/0315279 A1 * | 12/2009 | Yaksich | 279/62 |

FOREIGN PATENT DOCUMENTS

| | | | | | |
|---|---|---|---|---|---|
| EP | 0530431 | 3/1996 | | | |
| EP | 0677348 | 8/1997 | | | |
| EP | 0674960 | 4/1998 | | | |
| EP | 0674961 | 10/1999 | | | |
| EP | 0710518 | 1/2001 | | | |
| EP | 0710519 | 1/2001 | | | |
| EP | 0785041 | 2/2001 | | | |
| EP | 0710520 | 7/2001 | | | |
| EP | 1055472 | 9/2001 | | | |
| EP | 1029621 | 10/2001 | | | |
| EP | 1043100 | 7/2002 | | | |
| EP | 1302266 | 4/2003 | | | |
| EP | 1170078 | 9/2003 | | | |
| EP | 1371436 | 12/2003 | | | |
| EP | 1224993 | 7/2004 | | | |
| EP | 1452255 | 9/2004 | | | |
| EP | 1371435 | 7/2005 | | | |
| EP | 1170079 | 10/2005 | | | |
| JP | 02172605 A | * | 7/1990 | ............ | B23B 31/107 |
| JP | 03049808 A | * | 3/1991 | ............ | B23B 31/173 |

* cited by examiner

SELF-TIGHTENING CHUCK WITH A RADIAL LOCK

CLAIM OF PRIORITY

This application claims priority to U.S. Provisional Application Ser. No. 61/229,669, filed Jul. 29, 2009, the entire disclosure of which is incorporated by reference herein.

FIELD OF THE INVENTION

The present invention relates generally to chucks for use with drills or with electric or pneumatic power drivers. More particularly, the present invention relates to a chuck of the keyless type which may be tightened or loosened by hand or actuation of the driver motor.

BACKGROUND OF THE INVENTION

Hand, electric and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Various configurations of keyless chucks are known in the art and are desirable for a variety of applications.

SUMMARY OF INVENTION

The present invention recognizes and addresses consideration of prior art construction and methods. In one embodiment of the present invention, a drill chuck for use with a powered driver includes a spindle portion with a pusher bore on a first end, a spindle bore on a second end, an annular array of teeth disposed about its outer surface, and an annular groove defined by the outer surface of the first end. A body is rotatably disposed about the spindle portion and includes a central bore for receiving the spindle portion, an annular groove defined by an inner surface of the central bore adjacent a first end of the body, and a pawl pivotably mounted to a second end of the body, the pawl being configured to selectively engage the annular array of teeth on the spindle portion. A jaw pusher includes a threaded post and a head, the threaded post being disposed in the pusher bore and configured for axial motion relative to the spindle portion. A jaw guide is disposed on the first end of the body and includes a plurality of jaw slots formed therein. A plurality of jaws is slidably received in a corresponding jaw slot and slidably received by the head of the jaw pusher. A plurality of bearing balls is received between the annular groove of the spindle portion and the annular groove of the body. The annular groove of the spindle portion and the annular groove of the body are both continuous, thereby forming a continuous race for the plurality of bearing balls.

BRIEF DESCRIPTION OF THE DRAWINGS

The accompanying drawings, which are incorporated in and constitute a part of this specification, illustrate one or more embodiments of the invention and, together with the description, serve to explain the principles of the invention. A full and enabling disclosure of the present invention, including the best mode thereof, directed to one of ordinary skill in the art, is set forth in the specification, which makes reference to the appended drawings, in which.

Figure 1:
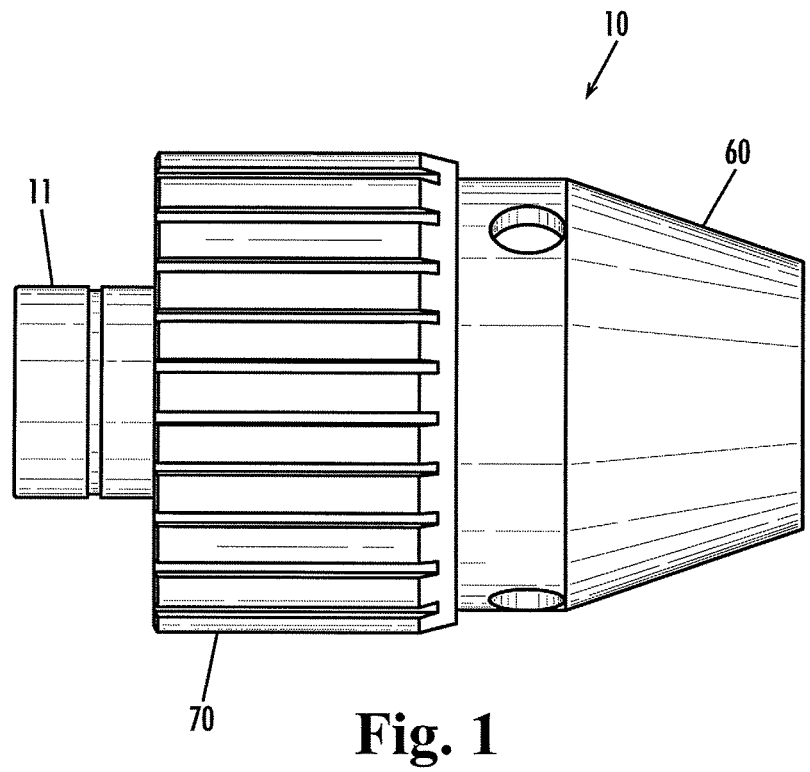
FIG. 1 is a side plan view of a chuck in accordance with an embodiment of the present invention.
Figure 4:
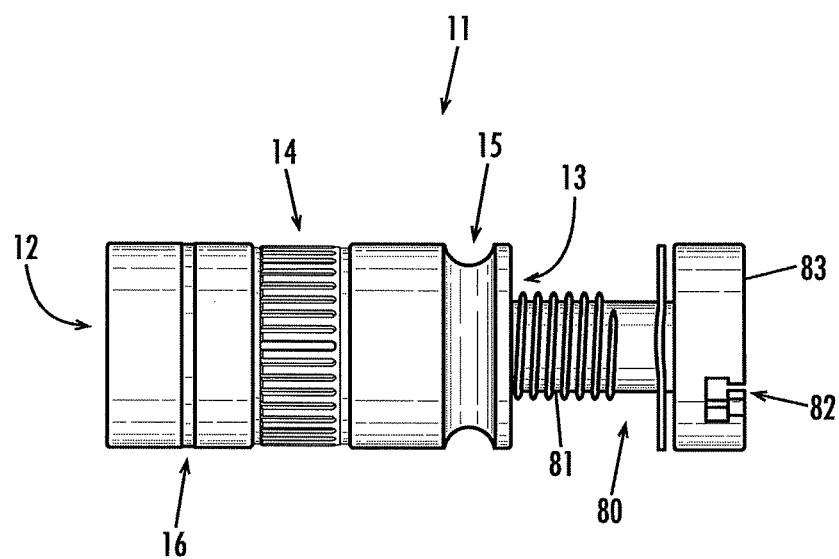
FIG. 4 is a side plan view of a spindle portion of the chuck as shown in FIG. 1.
Figure 2:
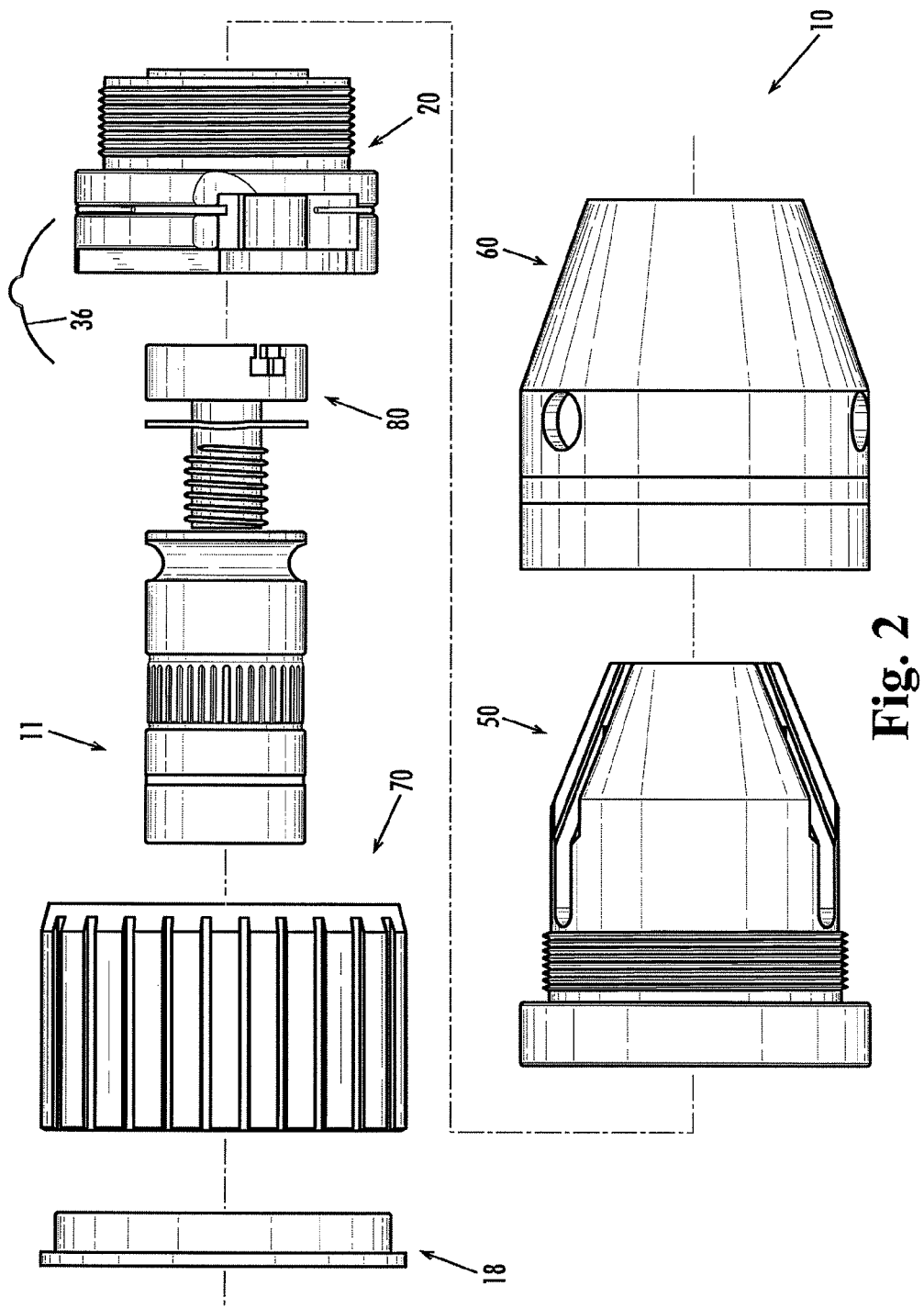
FIG. 2 is an exploded view of the chuck as shown in FIG. 1.
Figure 3:
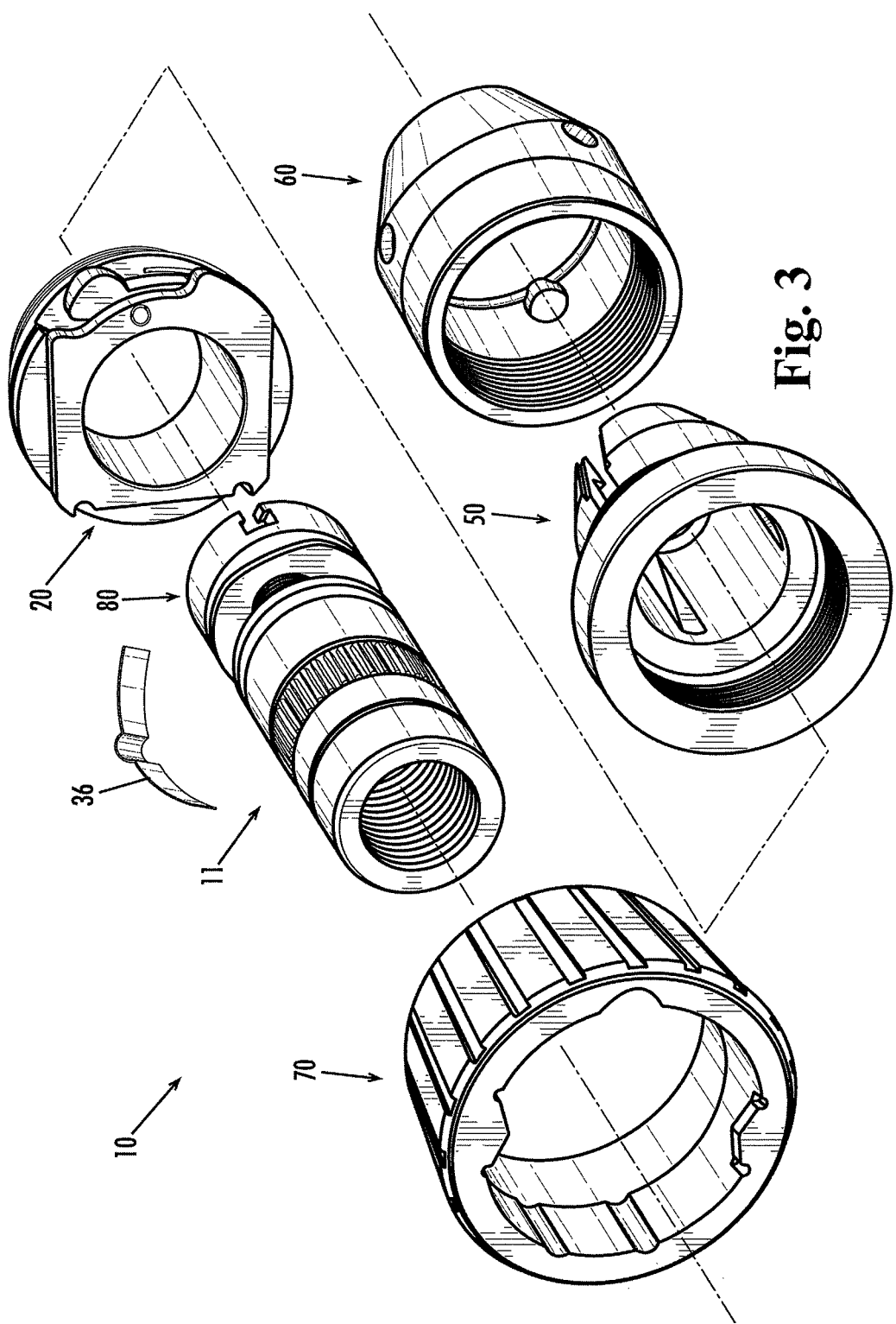
FIG. 3 is an exploded perspective view of the chuck as shown in FIG. 1.
Figure 5:
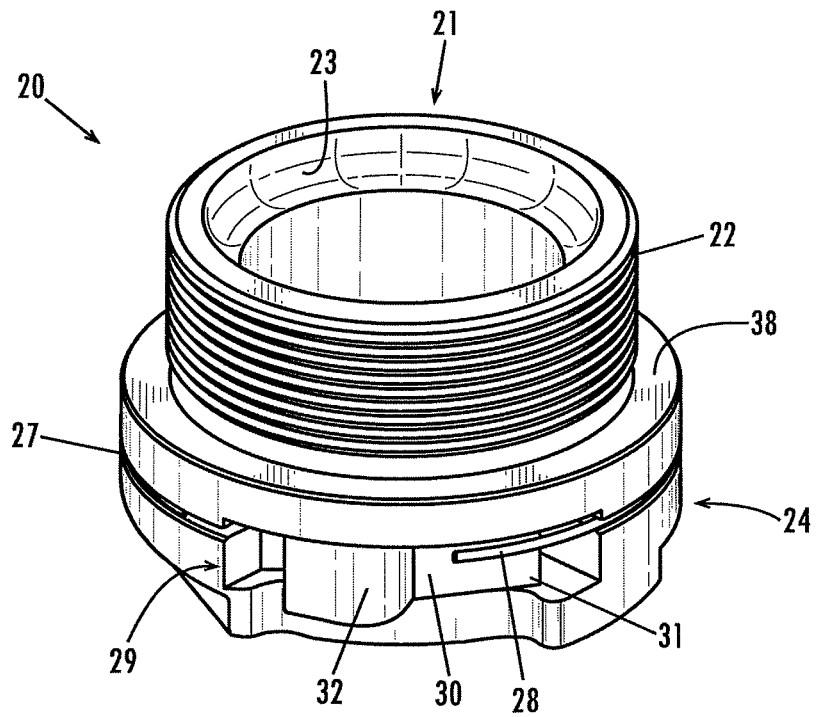
FIG. 5 is a perspective view of a body of the chuck as shown in FIG. 1.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to FIGS. 1 through 19, a chuck 10 in accordance with an embodiment of the present invention includes a spindle portion 11, a gripping mechanism, a body 20, a jaw guide 50, a front sleeve 60 and an actuating sleeve 70. In the embodiment illustrated, the gripping mechanism includes a plurality of jaws 90 carried by a jaw pusher 80. A key 91 of each jaw 90 is slidably received in a corresponding radial slot 82 in a head 83 of jaw pusher 80 such that each jaw 90 can move radially with respect to head 83. Spindle portion 11 is generally cylindrical in shape and includes a threaded spindle bore 12 formed in its rearward section and a threaded pusher bore 13 formed in its forward section. Pusher bore 13 is configured to rotatably receive a threaded post 81 of jaw pusher 80 that carries the plurality of jaws 90. Spindle bore 12 is of a standard size to mate with a drive shaft of a powered hand driver, for example, a power drill having a spindle. While spindle bore 12 of the present embodiment is threaded, in alternate embodiments, spindle bore 12 may be a tapered bore of a standard size to mate with a tapered drive shaft. Furthermore, spindle portion 11 may be formed integrally with the drive shaft.

Spindle portion 11 further defines an annular array of locking teeth 14 disposed about its outer surface, intermediate the forward and rearward ends, a first annular groove 15 disposed adjacent its forward end and a second annular groove 16 disposed adjacent its rearward end. Locking teeth 14 are configured to selectively receive corresponding locking teeth 31 carried by a pawl 30, as discussed in greater detail below. First annular groove 15 is formed on the outer surface of spindle portion 11 such that it opposes a corresponding third annular groove 23 formed about the inner surface of body 20 when body 20 is rotatably mounted about spindle portion 11. First annular groove 15 and third annular groove 23 are configured to receive a plurality of bearing balls (not shown) to thereby facilitate rotation of body 20 about spindle portion 11. Second annular groove 16 is disposed adjacent the rearward end of spindle portion 11 and is configured to receive a C-clip (not shown) that is used to retain rear cap 18 on spindle portion 11.

Figure 15:
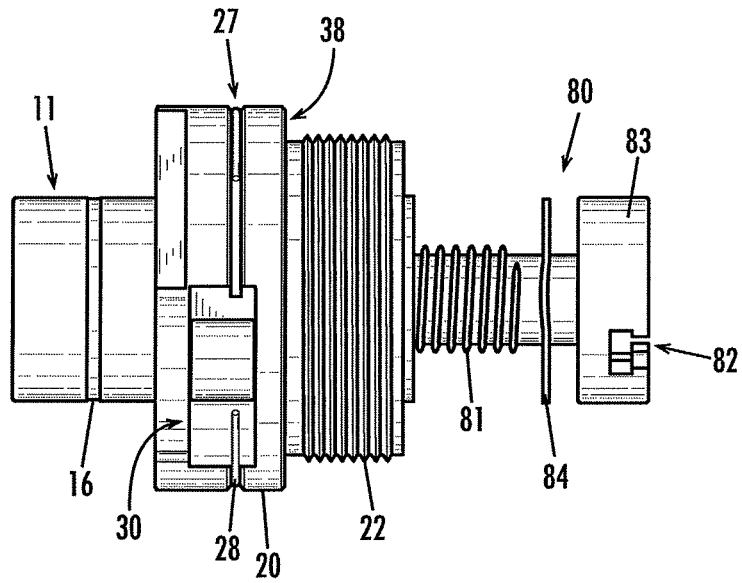
FIG. 15 is a side plan view of the body and the spindle portions of the chuck as shown in FIG. 1, in the assembled state.
Figure 16:
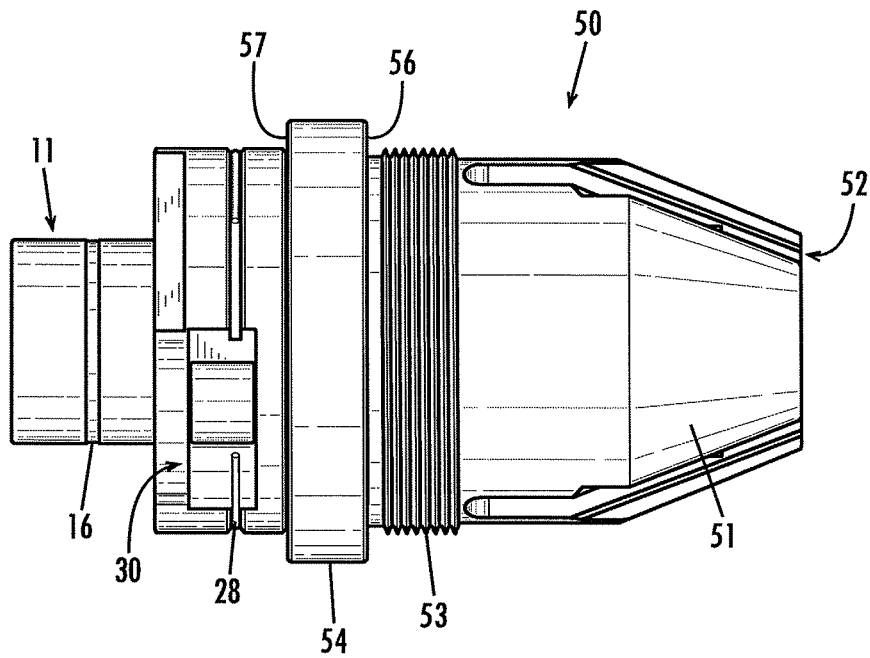
FIG. 16 is a side plan view of the body, the spindle portion and the jaw guide of the chuck as shown in FIG. 1, in the assembled state.
Figure 17:
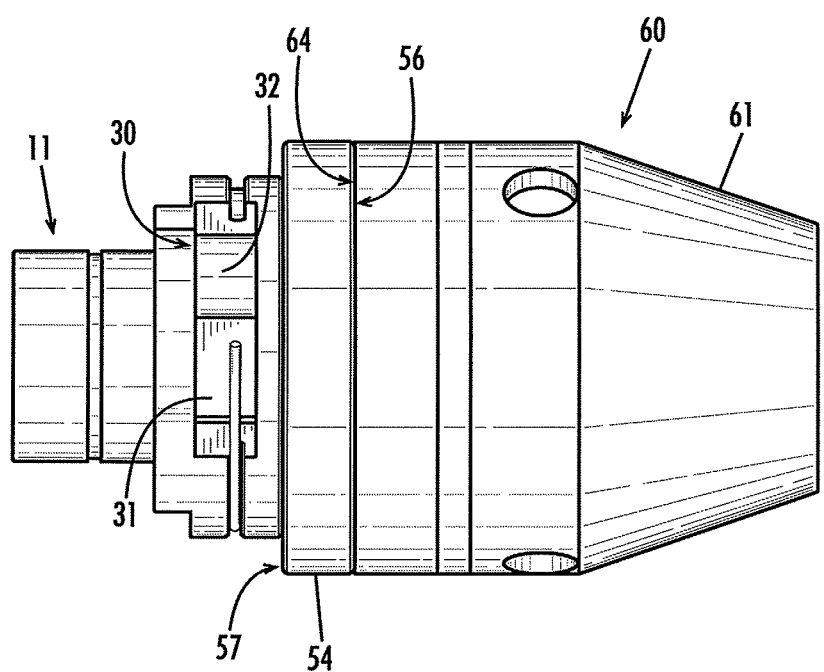
FIG. 17 is a side plan view of the body, the spindle portion, the jaw guide and the actuating sleeve of the chuck as shown in FIG. 1, in the assembled state.

Body 20 defines a central bore 21 that is configured to slidably receive spindle portion 11 therein, a forward section that includes a threaded outer portion 22 and third annular groove 23, and a rear section 24 that defines a pair of abutment flats 25 and 26, a fourth annular groove 27 and a pawl aperture 29. Threaded portion 22 is arranged and configured to threadedly receive jaw guide 50, as discussed in greater detail below, and third annular groove 23 is configured to receive a plurality of bearing balls along with first annular groove 15 of spindle portion 11, as noted above. As best seen in FIGS. 15 and 16, with body 20 rotatably mounted about spindle portion 11, and jaw guide 50 secured to body 20, first annular groove 15 and third annular groove 23 are completely enclosed within locking chuck 10 such that the plurality of bearing balls received therein is shielded from external elements.

A pawl 30 is pivotally mounted in pawl aperture 29 on a pin 33 that is received in corresponding apertures formed in body 20 and pawl 30. Pawl 30 includes an engagement end with locking teeth 31 that are configured to selectively engage locking teeth 14 of spindle portion 11 and a cam 32 formed on its opposite end that interacts with actuating sleeve 70 so as to engage and disengage locking teeth 31 of pawl 30 and locking teeth 14 of spindle portion 11 as pawl 30 is caused to pivot about pin 33. Note, in alternate embodiments, rather than providing a pawl aperture intermediate the forward and rear sections of body 20, pawl 30 can be pivotally mounted to a rear surface of body 20 for ease of manufacture.

Fourth annular groove 27 of body 20 is configured to receive a substantially C-shaped spring 28 therein such that a first end of spring 28 urges locking teeth 31 of pawl 30 radially inwardly. Spring 28 is held in position on body 20 by a second end that extends radially inward from the body of spring 28 that is received in a radially inwardly extending bore on body 20. The substantially circular form of spring 28 and means of attachment to body 20 allow spring 28 to be readily manufactured from a single piece of spring steel (or similar material) wire. The design of spring 28 and subsequent ease of manufacture of spring 28 lead to reduced costs, as well as improved durability of locking chuck 10. Abutment flats 25 and 26 interact with cooperating surfaces on the interior of actuating sleeve 70 and thereby limit the rotation of actuating sleeve 70 relative to body 20 to a predetermined range, as discussed below. Further, a detent spring 36 is carried by body 20 in a detent spring recess 35. Detent spring 36 includes a detent portion 37 that engages the inner surface of actuating sleeve 70, as discussed in greater detail below.

Figure 6:
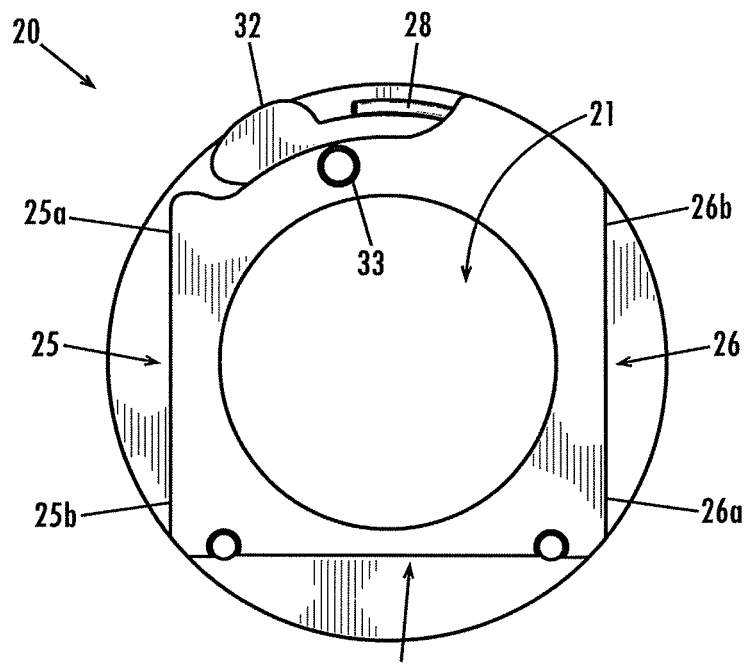
FIG. 6 is a bottom plan view of the body as shown in FIG. 5.
Figure 7:
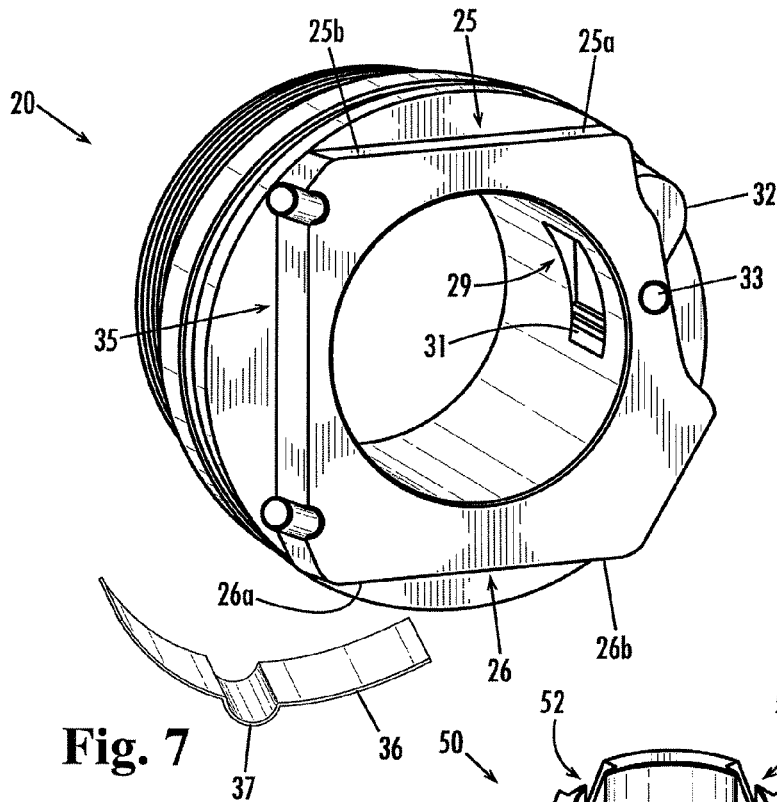
FIG. 7 is a perspective view of the body as shown in FIG. 5.
Figure 8:
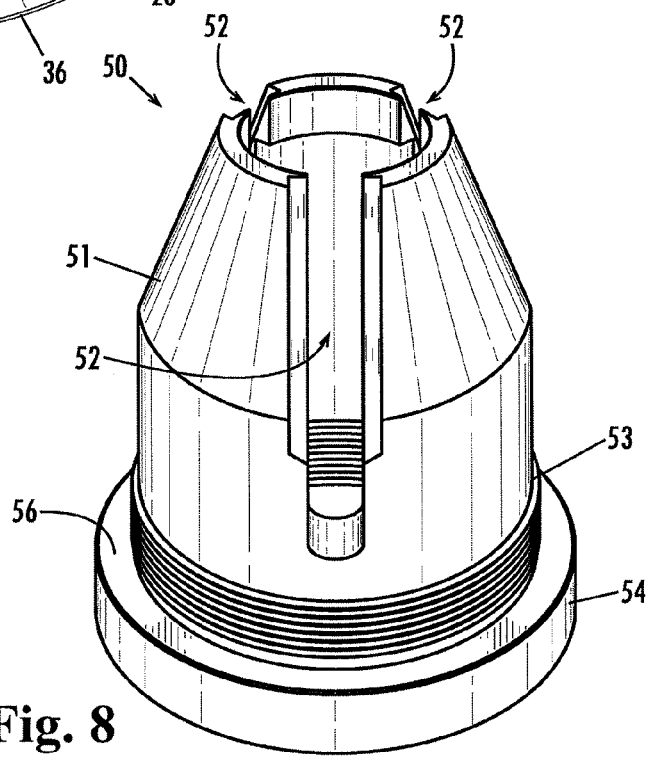
FIG. 8 is a perspective view of a jaw guide of the chuck as shown in FIG. 1.
Figure 9:
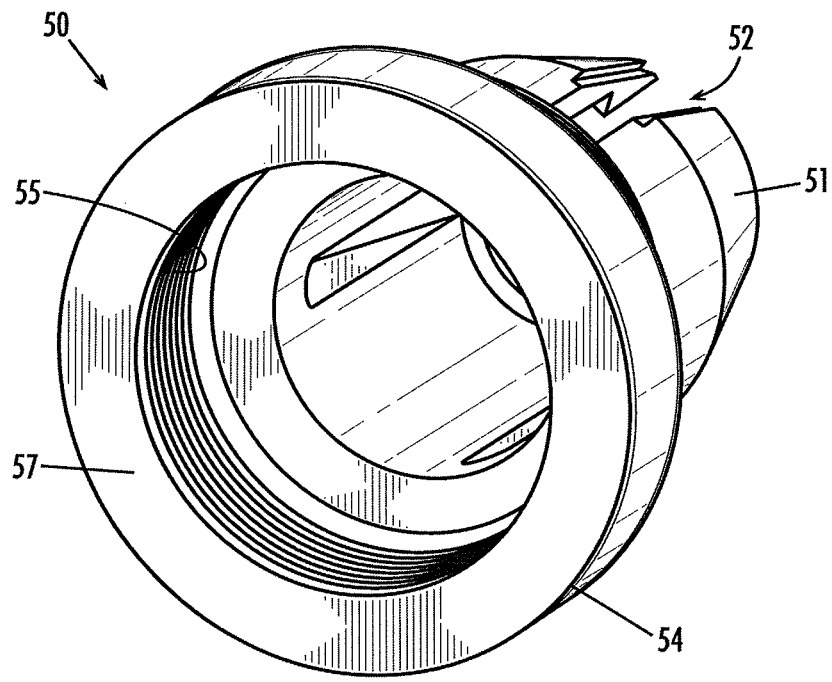
FIG. 9 is a perspective view of the jaw guide as shown in FIG. 8.
Figure 10:
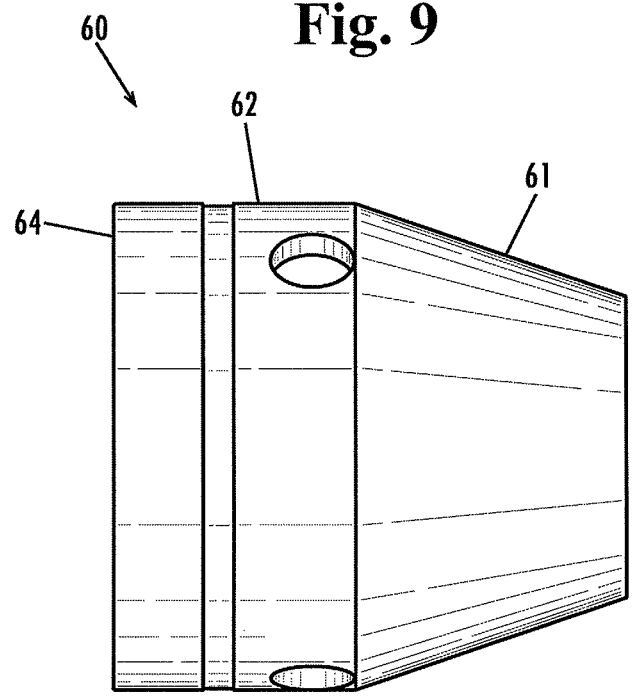
FIG. 10 is a side plan view of a front sleeve of the chuck as shown in FIG. 1.
Figure 11:
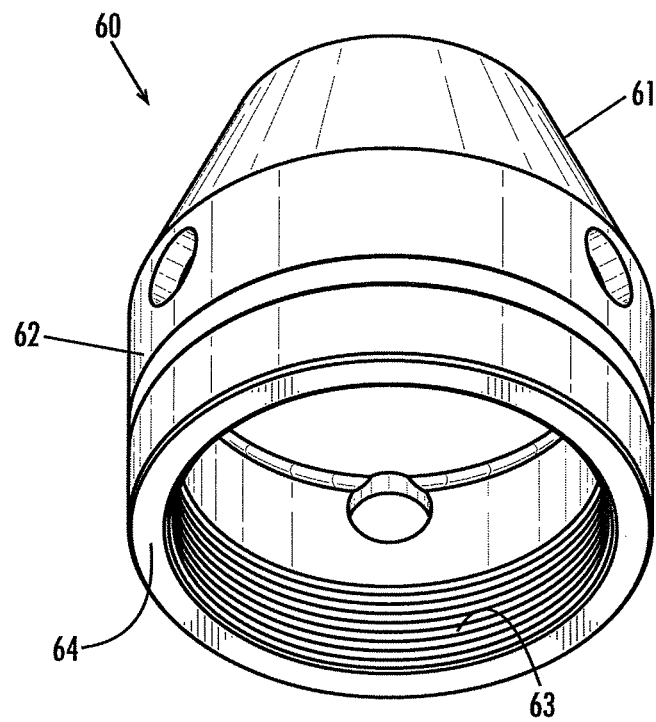
FIG. 11 is a perspective view of the front sleeve as shown in FIG. 10.

As best seen in FIGS. 6 and 7, in the preferred embodiment shown, rear section 24 of body 20 is substantially square in its outer circumferential surface. In this presently described embodiment, body 20 is manufactured by powdered metal, which is then pressed or compacted to attain the desired form. The use of powdered metal as the press process in manufacturing body 20 facilitates achieving square and/or angular shapes that are difficult to produce by convention turning operation using bar stock. Note, also, that the overall form of body 20 is one that allows pressing operations to be used in that body 20 can be readily removed from the press. The manufacture of parts using powdered metal techniques should be understood and is therefore not discussed in further detail herein.

Jaw guide 50 includes a frustoconical front section that defines a plurality of jaw guide slots 52 and a rear section that includes a threaded outer portion 53, a threaded inner portion 55 and a radial ledge 54 depending outwardly from the rear section. Each guide slot 52 slidably receives a portion of a corresponding jaw 90. Outer threaded portion 53 of jaw guide 50 engages a correspondingly threaded portion of front sleeve 60 so that front sleeve 60 threads onto, and is received over, jaw guide 50. Inner threaded portion 55 of jaw guide 50 threadedly engages threaded outer portion 22 of body 20 such that jaw guide 50 and body 20 are non-rotatable relative to each other, yet selectively rotatable as a unit about spindle portion 11. When jaw guide 50 is mounted on body 20, a rear surface 57 of radial ledge 54 abuts a front surface 38 of body 20. Note, radial ledge 54 extends outwardly beyond the outer perimeter of body 20.

Front sleeve 60 includes a frustoconical front section 61 and a substantially cylindrical rear section 62 that defines a threaded inner portion 63. Front section 61 of front sleeve 60 receives front section 51 of jaw guide 50 such that the plurality of jaws 90 is slidably restrained therebetween. Threaded inner portion 63 of front sleeve 60 threadedly engages threaded outer portion 53 of jaw guide 50 such that front sleeve 60 can be non-rotatably secured to jaw guide 50. As such, front sleeve 60, jaw guide 50 and body 20 can be selectively rotated as a unit about spindle portion 11. When front sleeve 60 is mounted to jaw guide 50, a rear surface 64 of front sleeve 60 abuts a front surface 56 of radial ledge 54. Note, the outer diameters of radial ledge 54 of jaw guide 50 and rear section 62 of front sleeve 60 are substantially the same.

Figure 12:
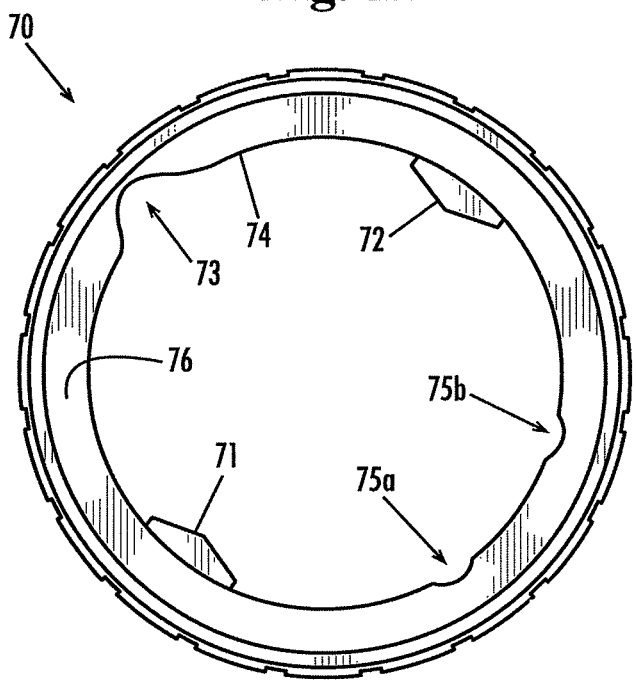
FIG. 12 is a top plan view of an actuating sleeve of the chuck as shown in FIG. 1.
Figure 13:
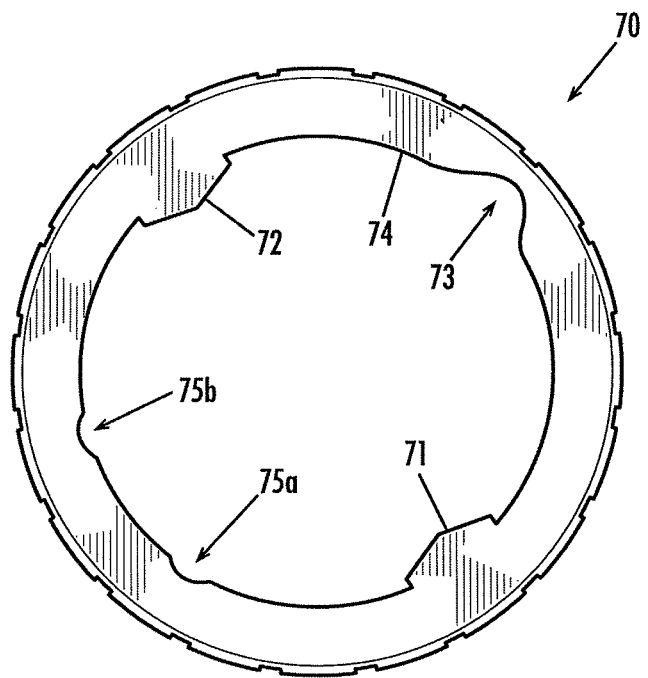
FIG. 13 is a bottom plan view of the actuating sleeve as shown in FIG. 12.
Figure 14:
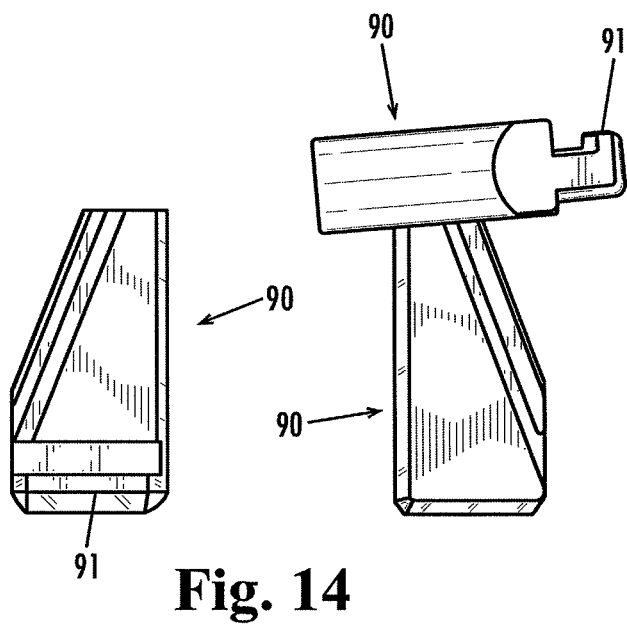
FIG. 14 shows various views of a plurality of jaws of the chuck as shown in FIG. 1.

As shown particularly in FIGS. 12 and 13, actuating sleeve 70 includes a pair of stops 71 and 72, a camming recess 73, a camming surface 74 and a pair of detent recesses 75a and 75b. As also indicated in FIGS. 6 and 17 through 19, each of stops 71 and 72 interacts with a corresponding abutment flat 26 and 25, respectively, to limit the rotation of actuating sleeve 70 relative to body 20 when alternating locking chuck 10 between its locked and unlocked positions. Camming recess 73 is arranged and configured to receive cam 32 of pawl 30 when locking chuck 10 is in the locked position. Camming recess 73 allows cam 32 to move radially outwardly such that the first end of spring 28 biases locking teeth 31 of pawl 30 radially inwardly to engage locking teeth 14 of spindle portion 11. In contrast, in the unlocked position, camming surface 74 of actuating sleeve 70 engages cam 32 of pawl 30 such that cam 32 is urged radially inwardly. As such, locking teeth 31 of pawl 30 are urged radially outwardly against the inward biasing force of the first end of spring 28. Detent recess 75a is configured to receive detent portion 37 when actuating sleeve 70 is in the unlocked position, whereas detent recess 75b is configured to receive detent portion 37 when actuating sleeve 70 is in the locked position.

Figure 18:
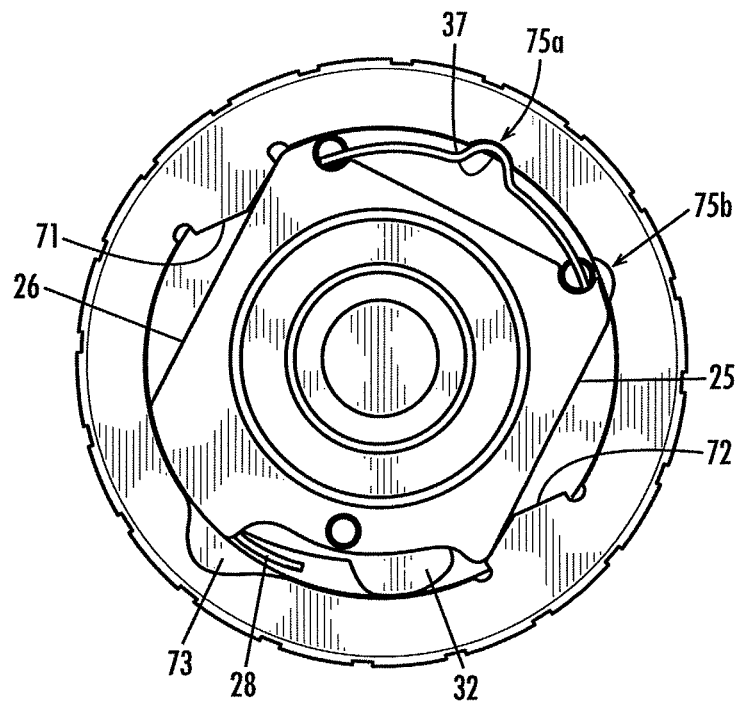
FIG. 18 is a bottom plan view of the chuck as shown in FIG. 1, with the actuating sleeve in the unlocked position.

Rotation of actuating sleeve 70 relative to body 20 causes locking chuck 10 to either lock or become unlocked. The unlocked position of locking chuck 10 is defined when cam 32 of pawl 30 is biased radially inwardly by camming surface 74 of actuating sleeve 70 such that locking teeth 31 become disengaged from locking teeth 14 of spindle portion 11. Further, in the unlocked position, detent portion 37 of detent spring 36 is received in unlocked detent recess 75a. As well, each of stops 71 and 72 of actuating sleeve 70 is in contact with an unlocked end 26a and 25a, respectively, of its corresponding abutment flat 26 and 25, respectively. As best seen in FIG. 18, in the unlocked position, when viewing locking chuck 10 from the rear, actuating sleeve 70 cannot be turned further in a clockwise direction relative to body 20.

To operate locking chuck 10, a user, when viewing locking chuck 10 from the rear, turns adjustment sleeve 70 in a counter-clockwise, or tightening, direction. This rotation of actuating sleeve 70 causes body 20, jaw guide 50 and front sleeve 60 to all rotate together as a unit in the same direction about spindle portion 11. As such, jaws 90 rotate with jaw guide 50 due to interaction with guide slots 52. Because jaws 90 are non-rotatably fixed to head 83 of jaw pusher 80, threaded post 81 is rotated within pusher bore 13 of spindle portion 11, subsequently causing jaws 90 to move forward and together to clamp onto the shank of a tool bit (not shown). Rotation of spindle portion 11 along with the other components of the locking chuck 10 is prevented by a spindle lock (not shown) of the tool on which locking chuck 10 is mounted, which is well known in the art. Spindle locks can be either manually engaged or automatic. When jaws 90 make contact with the tool bit, body 20, jaw guide 50 and front sleeve 60 can no longer rotate relative to spindle portion 11, leaving only actuating sleeve 70 to rotate. Actuating sleeve 70 continues to rotate in the tightening direction relative to body 20 until it is in the locked position.

Figure 19:
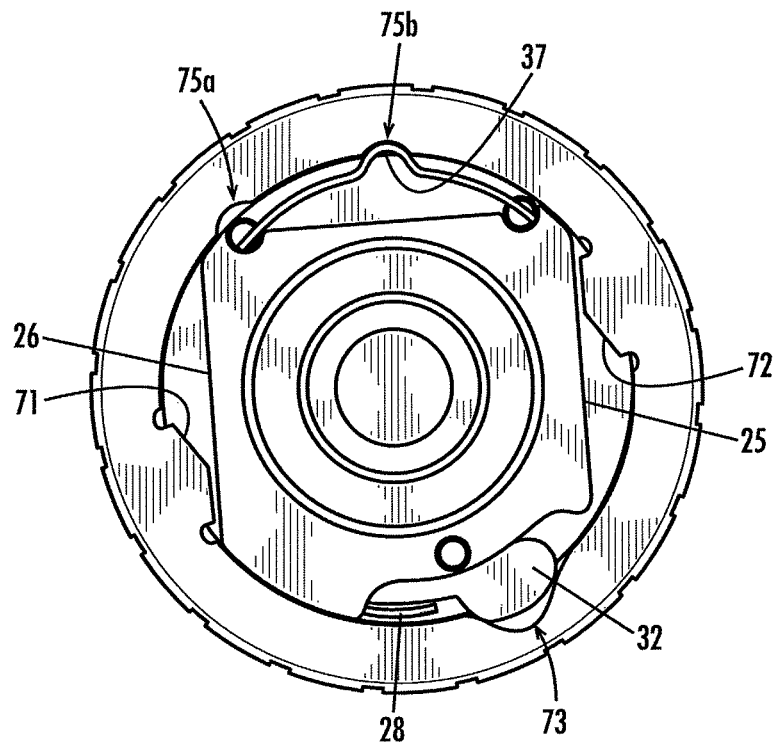
FIG. 19 is a bottom plan view of the chuck as shown in FIG. 1, with the actuating sleeve in the locked position.

As best seen in FIG. 19, the locked position of locking chuck 10 is defined by cam 32 being received in camming recess 73 of actuating sleeve 70 such that the first end of spring 28 urges locking teeth 31 of pawl 30 radially inwardly until they engage locking teeth 14 of spindle portion 11. As actuating sleeve 70 moves from the unlocked to the locked position, cam 32 of pawl 30 rides along camming surface 74 toward camming recess 73. Eventually cam 32 is received in camming recess 73 and allowed to move radially outwardly such that the first end spring 28 urges locking teeth 31 of pawl 30 radially inwardly until they engage locking teeth 14 of spindle portion 11. Additionally, as actuating sleeve 70 is rotated from the unlocked position to the locked position, detent portion 37 of detent spring 36 moves from unlocked detent recess 75a to locked detent recess 75b, and stops 71 and 72 of actuating sleeve 70 move from unlocked ends 26a and 25a, respectively, to locked ends 26b and 25b, respectively, of their corresponding abutment flats 26 and 25, respectively.

The engagement of locking teeth 31 of pawl 30 with locking teeth 14 of spindle portion 11 prevents rotation of body 20, jaw guide 50 and front sleeve 60 relative to spindle portion 11 in the clockwise, or opening, direction. Note, however, the continued rotation about spindle portion 11 in the counter-clockwise, or tightening direction, is still possible. More specifically, as locking teeth 31 of pawl 30 are rotated in the tightening direction, locking teeth 31 repeatedly slip over locking teeth 14 of spindle portion 11, thereby causing a clicking or ratcheting sound. The engagement of detent portion 37 of detent spring 36 with locked detent recess 75b prevents inadvertent rotation of actuating sleeve 70 relative to body 20 in the opening direction. As such, locking chuck 10 will remain locked until a user rotates actuating sleeve 70 in the opening direction with enough force to cause detent portion 37 to move from locked detent recess 75b to unlocked detent recess 75a, as described below.

To open locking chuck 10, starting from the locked position, a user, when viewing locking chuck 10 from the rear, turns actuating sleeve 70 in a clockwise, or loosening direction. As actuating sleeve 70 begins to rotate, detent portion 37 of detent spring 36 is disengaged from locked detent recess 75b and stops 71 and 72 move from locked ends 26b and 25b, respectively, to unlocked ends 26a and 25a, respectively, at which point detent portion 37 engages unlocked detent recess 75a. As well, as actuating sleeve 70 is rotated relative to body 20, camming surface 74 begins to engage cam 32 of pawl 30, thereby urging cam 32 radially inwardly. As such, locking teeth 31 of pawl 30 are urged radially outwardly against the biasing force of the first end of spring 28 until they are no longer engaged with locking teeth 14 of spindle portion 11. At this time, actuating sleeve 70, body 20, jaw guide 50 and front sleeve 60 begin to rotate as a unit about spindle portion 11. As such, jaws 90 are disengaged from the shank of the tool bit, and locking chuck 10 can be fully opened.

These and other modifications and variations to the present invention may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims.

What is claimed is:
1. A drill chuck for use with a powered driver, comprising:
  a spindle portion including a pusher bore on a first end, a spindle bore on a second end, an annular array of teeth disposed about its outer surface, and an annular groove defined by the outer surface of the first end;

a body rotatably disposed about the spindle portion, the body including a central bore for receiving the spindle portion, an annular groove defined by an inner surface of the central bore adjacent a first end of the body, and a pawl including an engagement end, the pawl being pivotably mounted to a second end of the body, the pawl being configured to selectively engage the annular array of teeth on the spindle portion;

a spring disposed on the body, the spring biasing the engagement end of the pawl radially inwardly and extending along substantially an entire circumference of the body;

a jaw pusher including a threaded post and a head, the threaded post being disposed in the pusher bore and configured for axial motion relative to the spindle portion;

a jaw guide disposed on the first end of the body, the jaw guide including a plurality of jaw slots formed therein;

a plurality of jaws, each jaw being slidably received in a corresponding jaw slot and slidably received by the head of the jaw pusher; and a plurality of bearing balls received between the annular groove of the spindle portion and the annular groove of the body, wherein the annular groove of the spindle portion and the annular groove of the body are both continuous, thereby forming a continuous pair of bearing races for the plurality of bearing balls.

2. The drill chuck of claim 1, wherein the annular groove of the spindle portion and the annular groove of the body are completely enclosed within the drill chuck such that the plurality of bearing balls is shielded from external elements.

3. The drill chuck of claim 1, wherein the body of the drill chuck comprises a powdered metal.

4. The drill chuck of claim 1, wherein the spring is substantially C-shaped.

5. The drill chuck of claim 4, wherein the spring is received in an annular groove defined in an outer surface of the body.

6. The drill chuck of claim 1, further comprising an actuating sleeve that is rotatably disposed about the body.

7. The drill chuck of claim 6, wherein the actuating sleeve is rotatable relative to the body between a first locked position and a second unlocked position.

8. The drill chuck of claim 7, wherein the actuating sleeve further comprises at least one stop extending radially inwardly that alternatingly abuts one of a first flat and a second flat formed on the body as actuating sleeve is rotated between the first locked position and the second unlocked position.

9. The drill chuck of claim 7, further comprising a detent spring disposed on the body that alternatingly engages one of a first detent recess and a second detent recess as the actuating sleeve is rotated between the first locked position and the second unlocked position.

10. A drill chuck for use with a powered driver, comprising:
a spindle portion including a pusher bore on a first end, a spindle bore on a second end, and an annular array of teeth disposed about its outer surface;

a body rotatably disposed about the spindle portion, the body being formed from a powdered metal and including a central bore for receiving the spindle portion;

a pawl including an engagement end, the pawl being pivotably mounted to a second end of the body, the pawl being configured to selectively engage the annular array of teeth on the spindle portion;

a spring disposed on the body, the spring biasing the engagement end of the pawl radially inwardly and extending along substantially an entire circumference of the body;

a jaw pusher including a threaded post and a head, the threaded post being disposed in the pusher bore and configured for axial motion relative to the spindle portion;

a jaw guide disposed on the first end of the body, the jaw guide including a plurality of jaw slots formed therein;

a plurality of jaws, each jaw being slidably received in a corresponding jaw slot and slidably received by the head of the jaw pusher; and an actuating sleeve that is rotatably disposed about the body, wherein the actuating sleeve is rotatable relative to the body between a first locked position and a second unlocked position.

11. The drill chuck of claim 10, wherein:
the spindle portion further comprises an annular groove defined by the outer surface of the first end;
the body further comprises an annular groove defined by an inner surface of the central bore adjacent a first end of the body; and
a plurality of bearing balls received between the annular groove of the spindle portion and the annular groove of the body,
wherein the annular groove of the spindle portion and the annular groove of the body are both continuous, thereby forming a continuous pair of bearing races for the plurality of bearing balls.

12. The drill chuck of claim 11, wherein the annular groove of the spindle portion and the annular groove of the body are completely enclosed within the drill chuck such that the plurality of bearing balls is shielded from external elements.

13. The drill chuck of claim 10, wherein the spring is substantially C-shaped.

14. The drill chuck of claim 13, wherein the spring is received in an annular groove defined in an outer surface of the body.

15. The drill chuck of claim 10, wherein the actuating sleeve further comprises at least one stop extending radially inwardly that alternatingly abuts one of a first flat and a second flat formed on the body as actuating sleeve is rotated between the first locked position and the second unlocked position.

16. The drill chuck of claim 15, further comprising a detent spring disposed on the body that alternatingly engages one of a first detent recess and a second detent recess as the actuating sleeve is rotated between the first locked position and the second unlocked position.

* * * * *